United States Patent [19]

Hinz et al.

[11] Patent Number: 5,364,852
[45] Date of Patent: Nov. 15, 1994

[54] PREPARATION OF COMPACT OR CELLULAR ELASTOMERS CONTAINING URETHANE AND UREA GROUPS, AND MOLDINGS PRODUCED THEREFROM

[75] Inventors: Werner Hinz, Frankenthal; Christian Maletzko, Mannheim; Johannes Becker, Ludwigshafen; Guenter Matzke, Ketsch, all of Germany

[73] Assignee: BASF Akitengesellschaft, Ludwigshafen, Germany

[21] Appl. No.: 53,759

[22] Filed: Apr. 29, 1993

[30] Foreign Application Priority Data

Jun. 6, 1992 [DE] Germany ............... 4218791

[51] Int. Cl.$^5$ .............. C08J 9/34; C08G 18/32; C08G 18/60
[52] U.S. Cl. .................. 521/159; 521/51; 521/163; 528/68; 528/61; 528/64
[58] Field of Search .......... 521/51, 159, 163; 528/68, 60, 61, 64

[56] References Cited

U.S. PATENT DOCUMENTS

| | | | |
|---|---|---|---|
| 4,048,105 | 9/1977 | Salisbury | 260/2.5 |
| 4,102,833 | 7/1978 | Salisbury | 521/159 |
| 4,218,543 | 8/1980 | Weber et al. | 521/51 |
| 4,269,945 | 5/1981 | Vanderhider et al. | 521/159 |
| 4,374,210 | 2/1983 | Ewen et al. | 521/159 |
| 4,396,729 | 8/1983 | Dominquez et al. | 521/51 |
| 4,433,067 | 2/1984 | Rice et al. | 521/51 |
| 4,444,910 | 4/1984 | Rice et al. | 521/51 |
| 4,465,858 | 8/1984 | Cuscurida et al. | 564/477 |
| 4,479,010 | 10/1984 | Cuscurida et al. | 564/477 |
| 4,767,836 | 8/1988 | Cuscurida et al. | 564/477 |
| 4,902,768 | 2/1990 | Gerkin et al. | 528/68 |
| 5,084,487 | 1/1992 | Becker et al. | 521/159 |
| 5,153,235 | 10/1992 | Becker et al. | 521/159 |

FOREIGN PATENT DOCUMENTS

| | | |
|---|---|---|
| 026915 | 4/1981 | European Pat. Off. . |
| 069286 | 1/1983 | European Pat. Off. . |
| 092672 | 11/1983 | European Pat. Off. . |
| 093334 | 11/1983 | European Pat. Off. . |
| 093336 | 11/1983 | European Pat. Off. . |
| 0438695 | 7/1991 | European Pat. Off. . |
| 1216538 | 3/1962 | Germany . |
| 1917408 | 4/1968 | Germany . |
| 1966058 | 4/1968 | Germany . |
| 1966059 | 4/1968 | Germany . |

OTHER PUBLICATIONS

EPO Search Report (with English Translation) Mar. 29, 1994.

*Primary Examiner*—James J. Seidleck
*Assistant Examiner*—Mary Critharis
*Attorney, Agent, or Firm*—Mary E. Golota

[57] ABSTRACT

Compact or cellular elastomers containing urethane and urea groups are prepared by reacting
a) at least one organic and/or modified organic polyisocyanate
b) at least one N-propoxylated polyoxyalkylene-polyamine containing at least 50% of secondary amino groups or a mixture of said N-propoxylated polyoxyalkylene-polyamines and polyoxyalkylene-polyamines containing 2 to 4 primary amino groups and having a molecular weight of from 1000 to 8000,
c) at least one alkyl-substituted aromatic polyamine having a molecular weight up to 500, in the presence or absence of
d) catalysts and, if desired,
e) blowing agents,
f) auxiliaries and/or
g) additives.

11 Claims, No Drawings

PREPARATION OF COMPACT OR CELLULAR ELASTOMERS CONTAINING URETHANE AND UREA GROUPS, AND MOLDINGS PRODUCED THEREFROM

The present invention relates to a process for the preparation of compact or cellular elastomers, preferably elastomer moldings, containing urethane and urea groups, by reacting organic, modified or unmodified polyisocyanates (a) with N-propoxylated polyoxyalkylene-polyamines containing at least 50% of secondary amino groups, or mixtures of said N-propoxylated polyoxyalkylene-polyamines and polyoxyalkylene polyamines containing 2 to 4 primary amino groups and having molecular weights of from 1000 to 8000 (b), and low-molecular-weight, alkyl-substituted aromatic polyamines, expediently by the RIM method, in closed molds.

The preparation of elastomers containing bonded urethane groups, urea groups or urethane and urea groups and processes for the production of resilient, compact or cellular moldings from these elastomers by the RIM (reaction injection molding) method are known from numerous patents and other publications.

According to DE-B-2622951 (U.S. Pat. No. 4,218,543), cellular or compact, resilient moldings having a closed surface layer of polyurethane-polyurea elastomers can be produced by the principle of reaction injection molding. The formulations which are suitable for this purpose essentially comprise organic polyisocyanates, polyols, reactive aromatic diamines or polyamines which are substituted in the o-position to the amino group by alkyl groups, and strong catalysts for the reaction between hydroxyl groups and isocyanate groups. It is essential here that the aromatic diamines or polyamines are infinitely miscible with polyols having a molecular weight of from 12000 to 1800 and containing alkyl substituents having 1 to 3 carbon atoms, where at least two of the alkyl substituents have 2 to 3 carbon atoms and each of the o-positions to the amino groups is substituted. Systems of this type have initiation times of down to less than one second; the transition from the liquid phase to the solid phase takes place virtually instantaneously, which results in the liquid reaction mixture as it were solidifying on the walls of the mold.

It is furthermore known that the reactivity of aromatically bonded amino groups toward isocyanates can be greatly reduced by electron-withdrawing substituents. According to DE-C-12 16 538 (British Patent 981,935), examples of aromatic diamines of this type are 3,3'-dichloro-4,4'-diaminodiphenylmethane, 3,3'-dinitro-4,4'-diaminodiphenylmethane and 3,3'-dichloro-4,4'-diaminodiphenyl; however, processing of these compounds requires complex and inconvenient equipment due to reservations about the health risk posed by them. However, the highly electronegative substituents of these compounds reduce the reactivity of the aromatically bonded amino groups so much that full curing in moldings produced by reaction injection molding requires up to 15 minutes and thus becomes uneconomic.

Polyurethane-polyurea formulations having, compared with the systems of DE-B-26 22 951, somewhat reduced reactivity are obtained, according to EP-A-026 915, if the aromatic diamines used are 3,3',5,5'-tetraalkyl-substituted 4,4'-diaminodiphenyl-methanes in which the alkyl radicals are identical or different and are methyl, ethyl, isopropyl, sec- or tertbutyl, it being necessary for at least one of the substituents to be isopropyl or sec-butyl. The tetraalkyl-substituted diaminodiphenylmethanes described are readily miscible with the polyols in the required amounts at room temperature and have little or no tendency towards crystallization, so that formulations are easy to handle under the usual conditions for conventional RIM systems. However, it has been found that the tetraalkyl-substituted 4,4'-diaminodiphenylmethanes described may not be reactive enough for specific applications.

Polyurethane-polyurea formulations which are somewhat more reactive than those described in EP-A-026 915 are described in EP-A-069 286. The aromatic diamines used are trialkyl-substituted meta-phenylenediamines in which two of the alkyl substituents are identical or different, linear or branched alkyl having 1 to 4 carbon atoms, and the third alkyl radical has 4 to 12 carbon atoms or is five- or six-membered cycloalkyl. Even with a relatively high content of diamines, the formulations have adequate flowability and give moldings having high heat distortion resistance and no progressive fall in the shear modulus curves from 100° to 200° C.

All these processes have the disadvantage that the difference in reactivity between the relatively high-molecular-weight compounds containing at least two primary hydroxyl groups and the aromatic diamines when isocyanate groups are adducted is significant, in spite of steric hindrance of the amino groups, and can only be overcome by using synergistic catalyst combinations of tertiary amines and metal salts, e.g. dibutyltin dilaurates, in order to accelerate the hydroxylisocyanate polyaddition reaction. However, polyurethanepolyurea elastomers prepared using metal salt catalysts depolymerize at above 150° C., and extended exposure to high temperatures can result in total loss of the mechanical properties of the material.

It is furthermore known to partly or exclusively use polyoxylene-polyamines having molecular weights of from 1100 to 16000 for the preparation of resilient polyurethane-polyurea or polyurea elastomers, for example from EP-A-033 498 (U.S. Pat. No. 4,269,945), EP-A-81 701, EP-A-93 861 (U.S. Pat. No. 4,396,729), EP-A-92 672, EP-A-93 862 (U.S. Pat. No. 4,444,910 and U.S. Pat. No. 4,433,067), EP-A-93 334 and EP-A-93 336.

According to EP-A-81 701 mentioned above as an example, relatively high-molecular-weight polyoxyalkylene-polyamines containing amino groups bonded to aliphatic or aromatic radicals can be used. However, aliphatic polyoxyalkylene-polyamines are known to be extremely reactive, so that processing of RIM formulations based on these compounds can result in considerable problems associated with the machines, in particular in the production of bulky moldings, for example due to short shot times and consequently output of a small amount of material. Somewhat slower to react than aliphatic polyoxyalkylene-polyamines are polyoxyalkylene-polyamines containing aromatically bonded amino groups. These compounds have the disadvantage of an expensive preparation in multistep processes and, in particular, relatively high viscosities, for example of more than 20,000 mPas at 25° C., which can cause considerable problems in the processing of formulations containing reinforcing agents.

According to EP-A-0 298 359 (U.S. Pat. No. 4,902,768), elastomers containing bonded N-alkylurea units or N-alkylurea and urethane units can be prepared by reacting polyisocyanates with chain extenders and N-alkylpolyoxyalkylene-polyamines having 2 to 12 carbon atoms in the alkyl group. Formulations of these formative components can also be converted to moldings by the RIM method. However, these N-alkyl-polyoxyalkylene-polyamines have the disadvantage that the resultant reaction mixture has poor flow properties due to the high amine reactivity, which means that large mold volumes can only be filled unsatisfactorily, in particular if the mold geometry has narrow cross-sections.

According to EP-A-0 438 696 (U.S. Pat, No. 5,084,487), resilient moldings based on elastomers containing bonded N-substituted urea and amide groups are produced from modified or unmodified organic polyisocyanates, polyazomethine-containing polyoxyalkylene-polyamine mixtures containing at least one polyazoemthine, at least one polyoxyalkylene-polyamine containing terminal secondary amino groups and at least one polyoxyalkylene-polyamine containing terminal primary amino groups, and alkyl-substituted aromatic polyamines. In EP-A-0 438 695 (CA-A-2,033,444), the polyazomethine-containing polyoxyalkylene-polyamine mixtures are replaced by N-benzylpolyoxyalkylene-polyamines, if desired in the form of a mixture with polyoxyalkylene-polyamines containing primary amino groups, as a formative component for the formation of the soft segments of the elastomers. This production process gives resilient moldings of good rigidity, increased elongation at break and better tear propagation resistance, or of low brittleness and increased heat distortion resistance. Further advantages are the improved flow properties and extended gelling time of the reaction mixture, which means that even large molds can be filled without difficulty. The only disadvantage of the processes described is the multistep, expensive preparation of the polyazomethines and the secondary polyoxyalkylene-polyamines.

Furthermore, U.S. Pat. No. 4,048,105, 4,102,833 and 4,374,210 disclose the use of isocyanate group-containing prepolymers and quasiprepolymers having NCO contents of from 9 to 31% by weight, prepared using unmodified or modified 4,4'-diphenylmethane diisocyanates, in polyurethane systems and the preparation of alkoxylated polyoxyalkylene-polyamines. According to DE-B-1 917 408, DE-A-1 966 059 and DE-A-1 966 058 (CA-A-914,850), poly-oxypropylene-diamines and -triamines can be reacted with ethylene oxide or propylene oxide at from 125° to 170° C. under inert conditions, and the resultant polyoxyalkylene-polyamine/alkylene oxide adducts can be further reacted with polyisocyanates to give polyurethane foams.

According to U.S. Pat. No. 4,465,858 and U.S. Pat. No. 4,479,010, alkoxylated polyoxyalkylene-polyamines having a tertiary amino group content of more or less than 90% are prepared by reacting polyoxyalkylene-polyamines with alkylene oxides at from 75° to 85° C. in the presence of from 5 to 15% by weight of water, based on the polyoxyalkylene-polyamine, and then treating the reaction mixture at from 75° to 135° C. The resultant alkoxylated polyoxyalkylene-polyamines are suitable for the production of flexible polyurethane foams, as polyurethane catalysts containing tertiary amino groups, or as crosslinking agents for polyurethane foams, elastomers and adhesives.

By selecting suitable relatively high-molecular-weight compounds containing at least two reactive hydrogen atoms, e.g. polyether-polyols and/or polyesterpolyols, polyoxyalkylene-polyamines containing primary amino groups bonded to aliphatic or aromatic radicals, or, in particular, appropriately substituted aromatic primary diamines as chain extenders and specific catalysts or catalyst systems, attempts have been made to match the RIM formulations to the given requirements, e.g. volume and geometry of the mold. However, this method has the disadvantage that the starting compounds employed affect not only the reactivity of RIM formulations, but also the mechanical properties of the resultant moldings. This means that moldings having certain spatial shapes and relatively large dimensions can in some cases only be produced with impaired mechanical properties, or not at all, since the reaction mixtures have, for example, inadequate flowability or cannot be introduced into the mold in the necessary amounts.

It is an object of the present invention to provide a process which starts from readily accessible and therefore inexpensive starting materials, in particular relatively high-molecular-weight polyamines of suitable reactivity, and gives elastomers, preferably elastomer moldings, expediently by the RIM method, which are at least comparable in their mechanical properties to polyurethane-polyurea or polyurea elastomers, but have lower brittleness, in particular low-temperature brittleness. The reaction mixtures should have good flow properties and allow a broader processing latitude, so that a significant reduction in the reject rate can be achieved during production of the moldings.

We have found that, surprisingly, this object is achieved by using secondary, N-propoxylated polyoxyalkylene-polyamines as the relatively high-molecular-weight compound containing reactive hydrogen atoms.

The present invention accordingly provides a process for the preparation of elastomers containing urethane and urea groups, by reacting a) at least one organic and/or modified organic polyisocyanate with b) at least one secondary polyoxyalkylene-polyamine and c) at least one alkyl-substituted aromatic polyamine having a molecular weight of up to 500, in the presence or absence of d) catalysts, wherein the secondary polyoxyalkylene-polyamines used are N-propoxylated polyoxyalkylene-polyamines containing at least 50% of secondary amino groups.

The elastomers, preferably elastomer moldings, containing urethane and urea groups and prepared according to the invention have lower brittleness, which represents a significant improvement, in particular at relatively low temperatures. However, particular mention should be made of the outstanding processing properties and good flow properties of the reaction mixture.

The following applies to the preparation of the N-proxylated polyoxyalkylene-polyamines containing at least 50% of secondary amino groups which can be used according to the invention and to the other starting materials which can be used in the process according to the invention for the preparation of the elastomers containing bonded urethane and urea groups and to the moldings made from these elastomers:

a) Suitable organic polyisocyanates are conventional aliphatic, cycloaliphatic and, preferably, aromatic polyisocyanates. Specific examples which may be mentioned are 1,6-hexamethylene diisocyanate, 1-isocyanato-3,5,5-trimethyl-3-isocyanatomethylcyclohexane, 2,4- and 2,6-hexahydrotolylene diisocyanate and the corresponding isomer mixtures, 4,4'-, 2,2'- and 2,4'-dicyclohexylmethane diisocyanate and the corresponding isomer mixtures, mixtures of 4,4'-, 2,2'- and 2,4'-dicyclohexylmethane diisocyanates and polymethylenepolycyclohexylene polyisocyanates, 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'-, and 2,4'- and 2,2'-diphenylmethane diisocyanates and polyphenylpolymethylene polyisocyanates (crude MDI) and mixtures of crude MDI and tolylene diisocyanates.

Modified polyisocyanates, i.e. products obtained by chemical reaction of the above diisocyanates and/or polyisocyanates, are frequently also used. Examples which may be mentioned are diisocyanates and/or polyisocyanates containing ester, urea, biuret, allophanate and, preferably, carbodiimide, isocyanurate and/or urethane groups. Specific examples are aromatic polyisocyanates containing urethane groups and having NCO contents of from 33.6 to 8% by weight, preferably from 31 to 21% by weight, for example 4,4'-diphenylmethane diisocyanate or tolylene diisocyanate modified with low-molecular-weight diols, triols, oxyalkylene glycols, dioxyalkylene glycols, polyoxyalkylene glycols having molecular weights of up to 800, the following being examples of dioxyalkylene glycols or polyoxyalkylene glycols, which can be employed individually or as mixtures: diethylene glycol, dipropylene glycol, polyoxyethylene glycol, polyoxypropylene glycol and polyoxypropylene-polyoxyethylene glycol.

Prepolymers containing NCO groups and having NCO contents of from 25 to 8% by weight, preferably 21 to 14% by weight, are also suitable. Also suitable are liquid polyisocyanates containing carbodiimide groups and/or isocyanate rings and having NCO contents of from 33.6 to 8% by weight, preferably from 31 to 21% by weight, for example based on 4,4'-, 2,4'- and/or 2,2'-diphenylmethane diisocyanate and/or 2,4- and/or 2,6-tolylene diisocyanate and, preferably, 2,4- and 2,6-tolylene diisocyanate, and the corresponding isomer mixtures, 4,4'- 2,4'- and 2,2'-diphenylmethane diisocyanate and the corresponding isomer mixtures, for example of 4,4'- and 2,4'-diphenylmethane diisocyanates, crude MDI and mixtures of tolylene diisocyanates and crude MDI, are also suitable.

However, the following are used in particular: (i) carbodiimide- and/or urethane-containing polyisocyanates made from 4,4'-diphenylmethane diisocyanate or a mixture of 4,4'- and 2,4'-diphenylmethane diisocyanates and having an NCO content of from 33.6 to 8% by weight, (ii) NCO-containing prepolymers having an NCO content of from 8 to 25% by weight, based on the prepolymer weight, and prepared by reacting polyoxyalkylene-polyols having a functionality of from 2 to 4 and having a molecular weight of from 600 to 6000 with 4,4'-diphenylmethane diisocyanate or a mixture of 4,4'- and 2,4'-diphenylmethane diisocyanates, and mixtures of (i) and (ii).

As stated above, suitable compounds for the preparation of the NCO-containing prepolymers are polyoxyalkylene-polyols having a functionality of from 2 to 4, preferably of 2 or 3, and having a molecular weight of from 600 to 6000, preferably from 2000 to 4500. Analogous polyoxyalkylene-polyols having molecular weights of from approximately 1000 to 8000 can be employed, for example, for the preparation of polyoxyalkylene-polyamines, which are themselves suitable starting materials for the preparation of the N-propoxylated polyoxyalkylene-polyamines which are suitable according to the invention or in combination therewith for the preparation of the elastomers containing bonded urethane and urea groups. Polyoxyalkylene-polyols of this type can be prepared from one or more alkylene oxides having from 2 to 4 carbon atoms in the alkylene radical and an initiator molecule containing from 2 to 4, preferably 2 or 3, reactive hydrogen atoms in bound form, by conventional processes, for example by anionic polymerization using alkali metal hydroxides, such as sodium hydroxide or potassium hydroxide, or alkali metal alcoholates, such as sodium methylate, sodium ethylate, potassium ethylate or potassium isopropylate, as catalysts or by cationic polymerization using Lewis acids, such as antimony pentachloride, boron trifluoride etherate inter alia, or bleaching earths as catalysts.

Examples of suitable alkylene oxides are tetrahydrofuran, 1,3-propylene oxide, 1,2- or 2,3-butylene oxide and, preferably, ethylene oxide and 1,2-propylene oxide. The alkylene oxides may be used individually, one after the other in an alternating manner or as mixtures. Examples of suitable initiator molecules are water, organic dicarboxylic acids, such as succinic acid, adipic acid, phthalic acid and terephthalic acid, aliphatic and aromatic, unsubstituted or N-monosubstituted or N,N- and N,N'-dialkyl-substituted diamines having from 1 to 4 carbon atoms in the alkyl radical, such as unsubstituted or mono- and dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexa methylene diamine, phenylenediamines, 2,3-, 2,4-, 3,4-and 2,6-tolylenediamine and 4,4'-, 2,4'- and 2,2'-diaminodiphenylmethane.

Other, suitable initiator molecules are alkanolamines, e.g. ethanolamine, diethanolmine, N-methyl- and N-ethylethanolamine, N-methyl- and N-ethyldiethanolamine and triethanolamine, and also ammonia. Polyhydric, in particular dihydric and/or trihydric alcohols and dialkylene glycols, such as ethanediol, propane-1,2-diol, propane-1,3-diol, butane-1,4-diol, hexane-1,6-diol, glycerol, trimethylolpropane, pentaerythritol, diethylene glycol and dipropylene glycol are preferably used.

The polyoxyalkylene-polyols can be used individually or in the form of mixtures.

b) The secondary polyoxyalkylene-polyamines (b) used are polyoxyalkylene-polyamines containing at least 50%, preferably at least 55%, in particular 70% of secondary amino groups which have been N-propoxylated according to the invention, or mixtures of secondary N-propoxylated polyoxyalkylene-polyamines of this type and polyoxyalkylene-polyamines containing 2 to 4, preferably 2 to 3, primary amino groups and having molecular weights of from 1000 to 8000, preferably from 1000 to 4000. It is advantageous to use N-propoxylated polyoxyalkylene-polyamines containing from 2 to 4, preferably 2 and/or 3 amino groups and having a molecular weight of from 1000 to 5000, preferably from 1000 to 3000, which expediently contain, as polyoxyalkylene radicals, bonded polyoxyethylene, polyoxypropylene, polyoxytetramethylene, polyoxytetramethylene-polyoxypropylene and/or —polyoxyethylene radicals, preferably polyoxypropylene-polyoxyethylene, in particular polyoxypropylene radicals.

The N-propoxylated polyoxyalkylene-polyamines which can be used according to the invention preferably contain
from 0 to 30%, in particular from 2 to 20%, of primary amino groups,
from 50 to 100%, in particular from 55 to 90%, of N-2-hydroxypropylamino groups,
from 0 to 30%, in particular from 8 to 20%, of N,N-di(2-hydroxypropyl)amino groups.

N-propoxylated polyoxyalkylene-polyamines of this type containing at least 50% of secondary amino groups can be prepared, for example, by reacting polyoxyalkylene-polyamines, preferably polyoxyalkylene-diamines and/or -triamines, with at least one mol, preferably from 1 to 2 mol, or 1,2-propylene oxide per -NH$_2$ group in the absence of water and catalysts at from 90° to 120° C., preferably from 100° to 110° C., and at from 1 to 8 bar, preferably 2 to 6 bar and, if necessary, separating off the excess, unreacted 1,2-propylene oxide, or by reacting said polyoxyalkylene-polyamines, preferably polyoxyalkylene-diamines and/or -triamines, with from 1.0 to 1.2 mol, preferably one mol, or 1,2-propylene oxide per -NH$_2$ group in the presence or absence of catalysts under said temperature and pressure conditions. The N-propoxylated polyoxyalkylene-polyamines are preferably prepared from polyoxyalkylene-diamines and/or -triamines having a molecular weight of from 1000 to 3000.

The polyoxyalkylene-polyamines containing amino groups bonded to aliphatic radicals which are preferably used for the preparation of N-2-hydroxypropyl-polyoxyalkylene-polyamines can be prepared by known processes, for example by cyanoalkylation of the polyoxyalkylene-polyols described, followed by hydrogenation of the resultant nitrile (U.S. Pat. No. 3,267,050) or by amination of polyoxyalkylene-polyols using ammonia in the presence of hydrogen and catalysts (DE-A-12 15 373).

Suitable polyoxyalkylene-polyamines containing amino groups bonded to aromatic radicals can be prepared, for example, by reacting the above-described polyoxyalkylene-polyols with aromatic polyisocyanates in an NCO:OH group ratio of at least 2, followed by hydrolysis of the aromatic NCO-containing prepolymers obtained to give polyamines, analogously to the processes of DE-A-29 48 419, DE-A-30 39 600, EP-A-84 141, EP-A-79 512, EPA-97 290, EP-A-97 298, EP-A-97 299, EP-A-99 537, EP-A-113 027, EP-A-113 020 and EP-A-154 768.

The polyoxyalkylene-polyamines can be used as individual compounds or in the form of mixtures of products having different molecular weights and functionalities. The polyoxyalkylene-polyamines may furthermore be mixtures of polyoxyalkylene-polyols and polyoxyalkylene-polyamines and/or partially aminated polyoxyalkylene-polyols, with the proviso that at least 50%, preferably at least 64%, in particular more than 90%, of the reactive terminal groups are amino groups, and these expediently comprise at least 85%, preferably more than 90%, of primary amino groups.

As stated above, resilient, compact or cellular moldings based on the elastomers containing urethane and urea groups can also be produced using mixtures of the N-propoxylated polyoxyalkylene-polyamines containing at least 50% of secondary amino groups (b) which are suitable according to the invention and the above-described polyoxyalkylene-polyamines (bi). These mixtures can be obtained, for example, by mixing previously prepared N-propoxylated polyoxyalkylene-polyamines (b) with polyoxyalkylene-polyamines (bi). In another process variant, the polyoxyalkylene-polyamines having 2 to 4 primary amino groups can be propoxylated using a substoichiometric amount of 1,2-propylene oxide. Resultant mixtures of (b) and (bi) expediently contain at least 50% of secondary amino groups.

c) The alkyl-substituted aromatic polyamines, having molecular weights of up to 500, preferably from 122 to 400, are in particular primary aromatic diamines which contain, in the ortho-position to the amino groups, at least one alkyl substituent which reduces the reactivity of the amino group due to steric hindrance, and which are liquid at room temperature and are at least partially miscible, but preferably infinitely miscible, under the processing conditions with the N-proxylated polyoxyalkylene-polyamines (b) or the mixtures of N-propoxylated polyoxyalkylene-polyamines (b) and polyoxyalkylene-polyamines containing primary amino groups (bi). Examples of suitable compounds are alkylsubstituted meta-phenylenediamines of the formula

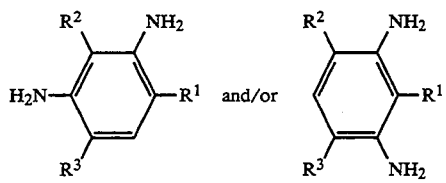

where $R^3$ and $R^2$ are identical or different and are methyl, ethyl, propyl or isopropyl, and $R^1$ is linear or branched alkyl having 1 to 10, preferably 1 to 6, carbon atoms. Also highly successful are branched alkyl radicals $R^1$ having 4 to 6 carbon atoms in which the branching point is on the C1 carbon atom. Specific examples of $R^1$ radicals are methyl, ethyl, isopropyl, 1-methyloctyl, 2-ethyloctyl, 1-methylhexyl, 1,1-dimethylpentyl, 1,3,3-trimethylhexyl, 1-ethylpentyl, 2-ethylpentyl, cyclohexyl, 1-methyl-n-propyl, tert-butyl, 1-ethyl-n-propyl, 1-methyl-n-butyl and 1,1-dimethyl-n-propyl.

Specific examples of alkyl-substituted m-phenylenediamines are: 2,4-dimethyl-6-cyclohexyl-, 2-cyclohexyl-4,6-diethyl-, 2-chyclohexyl-2,6-isopropyl-, 2,4-dimethyl-6-(1-ethyl-n-propyl)-, 2,4-dimethyl-6-(1,1-dimethyl-n-propyl)- and 2-(1-methyl-n-butyl)-4,6-dimethyl-1,3-phenylenediamine. Preference is given to 1-methyl-3,5-diethyl-2,4- and/or -2,6-phenylenediamines, 2,4-dimethyl-6-tert-butyl-, 2,4-dimethyl-6-isooctyl- and 2,4-dimethyl-6-cyclohexyl-1,3-phenylenediamine.

Also suitable are 3,3'-di- and/or 3,3',5.5'-tetra n-alkyl-substituted 4,4'-diaminodiphenylmethanes, e.g. 3,3'-dimethyl-, 3,3'-diethyl-, 3,3'-di-n-propyl-, 3,3',5,5'-tetramethyl-, 3,3',5,5'-tetraethyl- and 3,3', 5,5'-tetra-n-propyl-4,4'-diaminodiphenylmethane.

Preferred alkyl-substituted 4,4'-diaminodiphenylmethanes are those of the formula

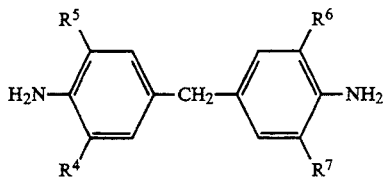

where $R^4$, $R^5$, $R^6$ and $R^7$ are identical or different and are methyl, ethyl, propyl, isopropyl, sec-butyl or tert-butyl, but where at least one of the radicals must be isopropyl or sec-butyl. The 4,4'-diaminodiphenylmethanes may also be used as a mixture with isomers of the formula

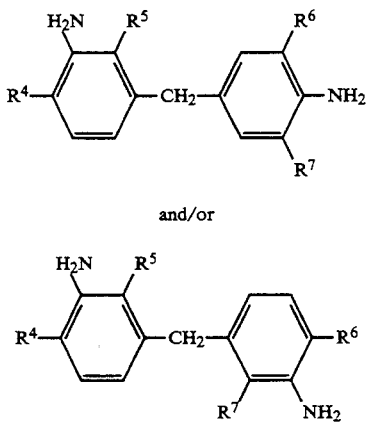

where $R^4$, $R^5$, $R^6$ and $R^7$ are as defined above.

Specific examples are: 3,3',5-trimethyl-5'-isopropyl-, 3,3',5-triethyl-5'-isopropyl-, 3,3',5-trimethyl-5'-sec-butyl-, 3,3',5-triethyl-5'-sec-butyl-, 3,3'-dimethyl-5,5'-diisopropyl-, 3,3'-diethyl-5,5'-diisopropyl-, 3,3'-dimethyl-5,5'-di-sec-butyl-, 3,3'-diethyl-5,5'-di-sec-butyl-, -3,5-di-methyl-3',5'-diisopropyl-, 3,5-diethyl-3',5'-diisopropyl-, 3,5'-dimethyl-3',5-di-sec-butyl-, 3,5-diethyl-3',5'-di-sec-butyl-, 3-methyl-3'-5,5'-triisopropyl-, 3-ethyl-3',5,5'-triisopropyl-, 3-methyl-3'-ethyl-5,5'-diisopropyl-, 3-methyl-3',5,5'-tri-sec-butyl-, 3-ethyl-3',5,5'-tri-sec-butyl-, 3,3'-diisopropyl-5,5'-di-sec-butyl-, 3,5-diisopropyl-3',5'-di-sec-butyl-, 3-ethyl-5-sec-butyl-3',5'-diisopropyl, 3-methyl-5-tert-butyl-3',5'-diisopropyl-, 3-ethyl-5-sec-butyl-3'-methyl-5'-tert-butyl-, 3,3'-5,5'-tetraisopropyl- and 3,3',5,5'-tetra-sec-butyl-4,4'-diaminodiphenylmethane. Preference is given to 3,5-dimethyl-3',5'-diisopropyl- and 3,3',5,5'-tetraisopropyl-4,4'-diaminodiphenylmethane. The diaminodiphenylmethanes can be employed individually or in the form of mixtures.

In order to prepare the elastomers containing bonded urethane and urea groups and moldings made from these elastomers by the process according to the invention, it is expedient to use the following, which are readily available industrially: 1,3,5-triethyl-2,4-phenylenediamine, 1-methyl-3,5-diethyl-2,4-phenylenediamine, mixtures of 1-methyl-3,5-diethyl-2,4- and -2,6-phenylenediamines, known as DETDA, mixtures of 3,3'-di- or 3,3',5,5'-tetraalkyl-substituted 4,4'-diaminodiphenylmethane isomers having 1 to 4 carbon atoms in the alkyl moiety, in particular 3,3',5,5'-tetraalkyl-substituted 4,4'-diaminodiphenylmethanes containing bonded methyl, ethyl and isopropyl radicals, and mixtures of the said tetraalkyl-substituted 4,4'-diaminodiphenylmethanes and DETDA.

In order to achieve specific mechanical properties, it may also be expedient to use the abovementioned alkyl-substituted aromatic polyamines (c) as a mixture with low-molecular-weight polyhydric alcohols, preferably dihydric and/or trihydric alcohols, or ether glycols. Specific examples of these polyhydric alcohols and ether glycols are: alkanediols, preferably having 2 to 6 carbon atoms, in particular ethanediol, 1,4-butanediol and 1,6-hexanediol, glycerol, trimethylolpropane, diethylene glycol, dipropylene glycol or mixtures of at least two of said compounds. This procedure has the disadvantage that, due to the different reactivities of the secondary amino groups and any primary amino groups compared with the hydroxyl groups, the reaction requires careful catalysis. If low-molecular-weight polyhydric alcohols are used at all, it has proven expedient to use a maximum of 50% by weight, preferably less than 20% by weight, based on the weight of the alkyl-substituted aromatic polyamines (c).

In order to prepare the elastomers containing urethane and urea groups, the organic polyisocyanates and/or modified organic polyisocyanate mixtures (a), N-prop-oxylated polyoxyalkylene-polyamines containing at least 50% of secondary amino groups (b) and alkyl-substituted primary aromatic polyamines (c) are expediently reacted in such amounts that the ratio between number of equivalents of NCO groups in component (a) and the total number of reactive hydrogen atoms in components (b) and (c) is from 0.85 to 1.25:1, preferably from 0.95 to 1.15:1, in particular from 0.98 to 1.10:1, and the ratio between N-propoxylated amino groups or the total number of N-propoxylated amino groups and primary amino groups of component (b) and, if used, (bi) to primary aromatic amino groups of component (c) is from 90:10 to 10:90, preferably from 40:60 to 15:85. If the reaction mixture additionally contains hydroxyl groups, these are identical to the amino groups with respect to the equivalence ratios.

The elastomers containing bonded urethane and urea groups are preferably prepared in the absence of catalysts. However, if catalysts are used, particular preference is given to highly basic amines. In order to produce heat-resistant moldings which can be painted on-line, it is expedient to completely omit synergistic organometallic compounds, e.g. organotin compounds. Specific examples of suitable catalysts are: amidines, e.g. 2,3-dimethyl-3,4,5,6-tetrahydropyrimidine, and tertiary amines, e.g. triethylamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine, N,N,N',N'',N''-pentamethyldiethylenetriamine, N,N,N',N'-tetramethyldiaminoethyl ether, N,N,N',N'-tetramethyl-4,4'-diaminodicyclohexylmethane, bis(dimethylaminopropyl)urea, dimethylpiperazine, 1,2-dimethylimidazole, 1-azabicyclo[3.3.0]octane and preferably 1,4-diazabicyclo[2.2.2]octane.

Other suitable catalysts are: tris(dialkylaminoalkyl)-s-hexahydrotriazines, in particular tris(N,N-dimethylaminopropyl)-s-hexahydrotriazine, tetraalkylammonium hydroxides, e.g. tetramethylammonium hydroxide, alkali metal hydroxides, e.g. sodium hydroxide, and alkali metal alkoxides, e.g. sodium methoxide and potassium isopropoxide, and alkali metal salts of long-chain fatty acids having 10 to 20 carbon atoms, with or without lateral OH groups. It is usual to use from 0.001 to 5% by weight, preferably from 0.05 to 2% by weight, of catalysts, based on the weight of component (b).

To produce resilient moldings from the novel elastomer containing urethane and urea groups, blowing agents (e) for producing cellular moldings and, if desired, auxiliaries (f) and/or additives (g) can, if desired, be introduced into the reaction mixture comprising components (a) to (c) and, if used, (d)

e) An example of a suitable blowing agent for them production of cellular moldings is water, which reacts with isocyanate groups to form carbon dioxide. The amount of water which can expediently be used is usually up to 5% by weight, preferably from 0.1 to 1.0% by weight, in particular from 0.2 to 0.4% by weight, based on the weight of component (b)s and (c).

Other blowing agents which can be used are low-boiling liquids which evaporate during the exothermic polyaddition reaction. Suitable liquids are those which are inert toward the organic polyisocyanate and have a boiling point of less than 100° C. Examples of preferred liquids of this type are halogenated, preferably fluorinated, hydrocarbons, such as methylene chloride and dichloromonofluoromethane, perfluorinated or partially fluorinated hydrocarbons, such as trifluoromethane, difluoromethane, difluoroethane, tetrafluoroethane and heptafluoropropane, hydrocarbons, such as n- and isobutane, n- and iso-pentane and technical-grade mixtures of these hydrocarbons, propane, propylene, hexane, heptane, cyclobutane, cyclopentane, cyclohexane, dialkyl ethers, such as dimethyl ether, dithyl ether and furan, carboxylic acid esters, such as methyl formate and ethyl formate, ketones, such as acetone, and-/or fluorinated and/or perfluorinated tertiary alkylamines, such as perfluorodimethylisopropylamine. Mixtures of these low-boiling liquids with one another and-/or with other substituted or unsubstituted hydrocarbons can also be used.

The most expedient amount of low-boiling liquid for the production of resilient, cellular moldings of this type depends on the desired density and, where appropriate, on the presence of water. In general, amounts of from 1 to 15% by weight, preferably from 2 to 11% by weight, based on the weight of components (b) and (c) give satisfactory results.

f) and g) Specific examples of suitable auxiliaries (f) and/or additives (g) are surfactants, foam stabilizers, cell regulators, fillers, reinforcing agents, flameproofing agents, external and/or internal release agents, dyes, pigments, hydrolysis-protection agents, and fungistatic and bacteriostatic substances.

Suitable surfactants are compounds which are used to support homogenization of the starting materials and may also be suitable for regulating the cell structure. Specific examples are emulsifiers, such as the sodium salts of castor oil sulfates or of fatty acids, and salts of fatty acids with amines, e.g. diethylamine oleate, diethanolamine stearate and diethanolamine ricinoleate, salts of sulfonic acids, e.g. alkali metal or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, turkey red oil and groundnut oil, and cell regulators, such as paraffins, fatty alcohols and dimethylpolysiloxanes. The surfactants are usually used in amounts of from 0.01 to 5 parts by weight, based on 100 parts by weight of components (b) and (c).

For the purposes of the present invention, fillers, in particular reinforcing fillers, are conventional organic and inorganic fillers and reinforcing agents known per se. Specific examples are inorganic fillers, such as silicate minerals, for example phyllosilicates, such as antigorite, serpentine, hornblendes, amphiboles, chrysotile, talc and zeolites, metal oxides, such as kaolin, alumina, titanium oxides and iron oxides, metal salts, such as chalk and barytes, and inorganic pigments, such as cadmium sulfide and zinc sulfide, and glass, inter alia. Preference is given to kaolin (china clay), aluminum silicate and coprecipitates of barium sulfate and aluminum silicate, and natural and synthetic fibrous minerals, such as wollastonite or in particular glass fibers of various lengths, which may be sized. Examples of suitable organic fillers are carbon black, carbon fibers, melamine, collophony, cyclopentadienyl resins and graft polymers based on styrene-acrylonitrile, which are prepared by in-situ polymerization of acrylonitrile/styrene mixtures in polyoxyalkylene-polyols in a similar manner to those given in German Patents 11 11 394, 12 22 669 (U.S. Pat. No. 3,304,273, 3,383,351, and 3,523,093), 11 52 536 (GB 1,040,452) and 11 52 537 (GB 987,618) and then aminated if desired, and also filler polyoxyalkylene-polyamines in which aqueous polymer dispersions are converted into polyoxyalkylene-polyamine dispersions.

The inorganic and organic fillers can be used individually or as mixtures. Preference is given to unsized or sized short glass fibers having lengths of less than 0.4 mm, preferably less than 0.2 mm.

The inorganic and/or organic fillers and/or reinforcing agents can advantageously be incorporated into the reaction mixture in amounts of from 0.5 to 35% by weight, preferably from 3 to 20% by weight, based on the weight of components (a) to (c).

Examples of suitable flameproofing agents are tricresyl phosphate, tris-2-chloroethyl phosphate, tris-chloropropyl phosphate and tris-2,3-dibromopropyl phosphate.

In addition to the abovementioned halo-substituted phosphates, it is also possible to use inorganic flameproofing agents, e.g. aluminum oxide hydrate, antimony trioxide, arsenic oxide, ammonium polyphosphate and calcium sulfate, or melamine, expandable graphite or mixtures thereof, for example mixtures of melamine, expandable graphite and/or ammonium polyphosphate, for flameproofing the moldings. In general, it has proved expedient to use from 5 to 50 parts by weight, preferably from 5 to 25 parts by weight, of the flameproofing agents mentioned per 100 parts by weight of components (b) and (c).

Further details on the other conventional auxiliaries and additives mentioned above can be obtained from the literature, for example from the monograph by J. H. Saunders and K. C. Frisch, High Polymers, Volume XVI, Polyurethanes, Parts 1 and 2, Interscience Publishers, 1962 and 1964 respectively, or Kunststoff-Handbuch, Polyurethane, Volume VII, Hanser-Verlag, Munich, Vienna, 1st and 2nd Editions, 1966 and 1983.

The resilient, compact moldings based on the elastomers according to the invention containing urethane and urea groups are expediently produced by the one-shot process using the low-pressure method or in particular by reaction injection molding (RIM) in open or preferably closed molds. Cellular moldings are produced by carrying out the reaction, in particular, with compaction in a closed mold. Reaction injection molding is described, for example, by H. Piechota and H. Röhr in Integralschaumstoffe, Carl Hanser-Verlag, Munich, Vienna, 1975; D. J. Prepelka and J. L. Wharton in Journal of Cellular Plastics, March/April 1975, pages 87 to 98, and U. Knipp in Journal of Cellular Plastics, March/April 1973, pages 76–84.

If a mixing chamber having several feed nozzles is used, the starting components can be fed in individually and mixed vigorously in the mixing chamber. It has proven particularly advantageous to use the two-component method, combining formative components (b) and (c) and, if used, (d) to (g) in component (A) and using, as component (B), organic polyisocyanates or modified polyisocyanate mixtures. It is advantageous here, for example, that components (A) and (B) can be stored separately and transported using a minimum of space and merely need to be mixed in the appropriate amounts during processing.

The amount of reaction mixture introduced into the mold is such that the moldings obtained, which may be cellular, have a density of from 250 to 1400 kg/m$^3$, the compact moldings preferably having a density of from 1000 to 1400 kg/m$^3$, in particular from 1000 to 1200 kg/m$^3$, and the cellular and microcellular moldings preferably having a density of from 400 to 1100 kg/m$^3$, for example from 450 to 750 kg/m$^3$, in particular from 550 to 650 kg/m$^3$, for shoe soles, and from 700 to 1200 kg/m$^3$, in particular from 950 to 1150 kg/m$^3$, for panelling elements. The starting components are introduced into the mold at from 15° to 80° C., preferably from 30° to 65° C. The mold temperature is expediently from 20° to 110 C., preferably from 35° to 95° C. and in particular from 35° to 75° C. The degree of compaction for the production of microcellular or cellular moldings is from 1.1 to 8, preferably from 2 to 6.

Although demolding of the elastomer moldings produced according to the invention is easy, it has proven advantageous, in order to improve demolding, to coat the internal surfaces of the mold, at least at the beginning of a production run, with conventional external mold-release agents, for example based on wax or silicone, or, in particular, with aqueous soap solutions. However, internal mold-release agents, as described, for example, in EP-A-153 649, EP-A-180 749 (AU 85/47,498), EP-A-173 888 (U.S. No. 4,519,965), WO 84/03,288 (EP-A-119 471) and WO 86/01,215, have proven particularly successful and are therefore preferred. The mold dwell times are on average from 3 to 60 seconds, depending on the size and geometry of the molding.

The compact moldings obtainable by the process according to the invention are preferably used in the automotive and aircraft industries, for example as bumper covers, bump strips, body parts, e.g. rain gutters, mudguards, spoilers, wheel arch extensions and for other industrial housing parts and rollers. Cellular moldings are suitable for shoe soles, armrests, headrests, sun visors, safety covers in vehicle cabins, and as motorcycle, tractor and bicycle saddles, seat cushions and top layers in composite elements.

EXAMPLES

EXAMPLE 1

Preparation of an N,N'-di(2-hydroxypropyl)polyoxypropylenediamine mixture

In order to remove the volatile constituents, 7480 g of a polyoxypropylenediamine of the structure

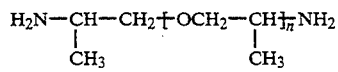

having a mean molecular weight of 2000 (Jeffamine ® D 2000 from Texaco AG) were treated for 1 hour at 105° C./1.33 mbar in a 10 l autoclave.

520 g 1,2-propylene oxide were subsequently metered in at 105° C. over a period of 1 hour. After a reaction time of 20 hours at 105° C., all the unreacted 1,2-propylene oxide was removed under reduced pressure at 33 mbar for 30 minutes and subsequently at 1.33 mbar for 60 minutes. The N-propoxylated polyoxypropylenediamine prepared in this way had a hydroxyl number of 87, a viscosity of 367 mPas at 25° C. (Ubbelohde), contained 6% of primary amino groups, 84% of N-2-hydroxypropylamino groups and 10% of N,N-di(2-hydroxypropyl)amino groups, and had a residual water content of 0.075% by weight and a pH of 11.7.

The comparative substances used for the production of moldings were the following:

Polyoxypropylanediamine (I) having a mean molecular weight of 2000 (Jeffamine ® D 2000 from Texaco AG) and N,N'-dibenzylpolyoxypropylenediamine (II).

The N,N'-dibenzylpolyoxypropylenediamine (II) was prepared via N,N'-polyoxypropylenedibenzylimine by the following method:

a) Preparation of N,N'-polyoxypropylenedibenzylimine 6000 parts by weight of a polyoxypropylenediamine having the structure

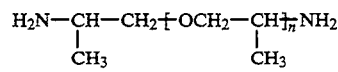

and a mean molecular weight of 2000 (Jeffamine ® D 2000 from Texaco AG) were held at 50° C. in a 10 liter three-necked flask fitted with stirrer, dropping funnel and distillation attachment. With vigorous stirring, 1300 parts by weight of a solution comprising
650 parts by weight of benzaldehyde in
650 parts by weight of cylcohexane were added dropwise over the course of one hour, and the mixture was then stirred at 50° C. for a further 15 minutes.

The volatile constituents of the reaction mixture were removed at a bottom temperature of up to 100° C., first at atmospheric pressure and subsequently with continuous reduction in the pressure to from 2 to 3 mbar, giving, as residue, 6500 parts by weight of N,N'-polyoxypropylenedibenzylimine, which was hydrogenated without further purification.

b) Preparation of N,N'-dibenzylpolyoxypropylenediamine (II)

In a 10 liter autoclave, 6000 parts by weight of the N,N'-polyoxypropylenedibenzylimine prepared in Example A were hydrogenated using hydrogen for 20 hours at 130° C. at 200 bar in the presence of 250 parts by weight of Raney nickel which had previously been washed with methanol and cyclohexane. After the pressure in the autoclave had been released, the reaction mixture was filtered under pressure, the volatile constituents subsequently removed at 5 mbar at a maximum bottom temperature of 150° C.

N,N′-dibenzylpolyoxypropylenediamine was obtained in virtually quantitative yield.

The polyoxypropylenedicyclopentylimine (III) used as an additive was prepared as follows:

520 g of polyoxypropylenediamine having a mean molecular weight of 230 (Jeffamine ® D 230 from Texaco AG) were mixed at room temperature with 675 g of a solution comprising 425 g of cyclopentanone and 250 g of toluene, and the resultant reaction mixture was refluxed on a water separator until water no longer separated out (duration about 9 hours). The toluene and the excess cyclopentanone were then removed by distillation under reduced pressure at from 100° to 120° C., giving, as residue, 810 g of polyoxypropylenedicyclopentylimine, which was used without further purification.

Production of the moldings from elastomers containing urethane and urea groups.

EXAMPLE 2

Polyoxyalkylene-polyamine components (Component A) Mixture comprising 66.5 parts by weight of N,N′-di(2-hydroxypropyl)-polyoxypropylenediamine mixture from Example 1

30.0 parts by weight of a mixture of 1-methyl-3,5-diethyl-2,4-phenylenediamine and 1-methyl-3,5-diethyl-2,6-phenylenediamine in the weight ratio 80:20, 3.0 parts by weight of N,N′-polyoxypropylenedicyclopentylimine (III) and 0.5 parts by weight of oleic acid.

Isocyanate component (Component B)

An NCO group-containing prepolymer having an NCO content of 20% by weight, prepared by reacting a carbodiimide group-containing 4,4′-diphenylmethanediisocyanate having an NCO content of 29.5% by weight with a dipropylene glycol-initiated polyoxypropylene-diol having an hydroxyl number of 56.

The polyoxyalkylene-polyamine component (A) and the isocyanate component (B) were mixed in an A:B mixing ratio of 100:96.5 parts by weight in a Puromat ® 30 high-pressure metering unit from Elastogran Polyurethane GmbH, Machine Construction Division, and injected into a metallic mold having the internal dimensions 400×200×4 mm which was held at 90° C. Component A was at 65° C. and component B was at 50° C.

The flow distance of the reaction mixture was measured using an S-shaped flow channel held at 90° C. and having a diameter of 10 mm at a discharge rate of 300 g/s and a shot time of 1 s.

COMPARATIVE EXAMPLES I and II

The procedure was similar to that of Example 2, but the N,N′-di(2-hydroxypropyl)polyoxypropylenediamine mixture according to the invention was replaced by the abovementioned polyoxypropylenediamine (I) or N,N′-dibenzylpolyoxypropylenediamine (II).

COMPARATIVE EXAMPLE I

Polyoxyalkylene-polyamine component (Component A) Mixture comprising 66.5 parts by weight of polyoxypropylenediamine (I) (Jeffamine ® D 2000)

30.0 parts by weight of a mixture of 1-methyl-3,5-diethyl-2,4-phenylenediamine and 1-methyl-3,5-diethyl-2,6-phenylenediamine in the weight ratio 80:20, 3.0 parts by weight of N,N′-polyoxypropylenedicyclopentylimine (III) and 0.5 parts by weight of oleic acid.

COMPARATIVE EXAMPLE II

Polyoxyalkylene-polyamine component (Component A) Mixture comprising 66.5 parts by weight of N,N′-dibenzylpolypropylenediamine (II), 30.0 parts by weight of a mixture of 1-methyl-3,5-diethyl-2,4-phenylenediamine and 1-methyl-3,5-diethyl-2,6-phenylenediamine in the weight ratio 80:20, 3.0 parts by weight of N,N′-polyoxypropylenedicyclo-pentylimine (III) and 0.5 parts by weight of oleic acid.

Table 1 shows the A:B mixture ratios used and the flow behavior measured by the above-described method at 90° C., and the shore hardnesses after 40 seconds as a measure of the curing behavior.

TABLE 1

| Ex. | Comp. Ex. | A:B mixing ratio = 100: | NCO index | Flow distance cm | Shore D hardness after 40 seconds. |
|---|---|---|---|---|---|
| 2 |   | 96.5 | 110 | 181 | 50 |
|   | I | 97.2 | 110 | 168 | 50 |
|   | II | 95.3 | 110 | 193 | 47 |

The following mechanical values were measured on the moldings held at 160° C. for 1 hour (Table 2).

TABLE 2

|   |   | Example 2 | Comparative example I | Comparative example II |
|---|---|---|---|---|
| Density | DIN 53420 kg/m$^3$ | 1110 | 1098 | 1099 |
| Tear strength | DIN 53504 N/mm$^2$ | 35 | 34 | 37 |
| Elongation at break | DIN 53504 % | 184 | 190 | 219 |
| Tear propagation resistance | DIN 53515 N/mm$^2$ | 33 | 24 | 24 |
| Hardness | DIN 53505 Shore D | 69 | 70 | 73 |
| Modulus of elasticity in bending | DIN 53457 N/mm$^2$ | 658 | 616 | 616 |
| HDT measured in accordance with ISO 75/B | DIN 53461 °C. | 158 | 160 | 158 |

The results obtained from Example II and Comparative Examples I and II show that comparable mechanical properties are achieved. At the same time, the flow properties of Example 2 are considerably improved compared with Comparative Example I. Compared with Comparative Example II, the advantage is the considerably simplified and therefore lower cost preparation of the N-propoxylated polyoxyalkylene-polyamines containing at least 50% of secondary amino groups which can be used according to the invention.

In order to test the brittleness/fracture sensitivity of the moldings, test sheets with a thickness of 2 mm were prepared and tested for brittleness by folding within the first 30 minutes of the demolding. If fracture occurred during this time period, the molding was classified as brittle "low-temperature brittle").

EXAMPLE 3

The procedure was similar to that of Example 2, using the same recipe, but with the A:B mixing ratio increased to 100:105.2. This corresponds to an NCO index of 120. Even at this higher figure, no brittleness or fracture sensitivity of the moldings was observed when the N-propoxylated polyoxypropylene-polyamine according to the invention was used.

COMPARATIVE EXAMPLE III

The procedure was similar to that of Comparative Example I, but the A:B mixture ratio was increased to 100:106.1. This again corresponds to an NCO index of 120. The test sheets obtained fractured after cooling (15 minutes).

COMPARATIVE EXAMPLE IV

Since brittleness was observed here even at an NCO index of 110 (Comparative Example II), the procedure used was similar to that of Comparative Example II, but the A:B mixing ratio was reduced to 100:91.5. This corresponds to an NCO index of 105. Only at this reduced index was no fracture of the test sheets after cooling observed.

TABLE 3

| Ex. | Comp. Ex. | A:B mixing ratio = 100: | NCO index | Flow distance cm | Shore D hardness after 40 seconds. |
|---|---|---|---|---|---|
| 3 | | 105.2 | 120 | 189 | 47 |
| | II | 106.1 | 120 | 179 | 48 |
| | III | 91.5 | 105 | 191 | 48 |

The following mechanical values were measured on moldings held at 160° C. for 1 hour (Table 4).

TABLE 4

| | | Example 3 | Comparative example I | Comparative example II |
|---|---|---|---|---|
| NCO index | | 120 | 110 | 110 |
| Density | DIN 53420 kg/m$^3$ | 1110 | 1098 | 1099 |
| Tear strength | DIN 53504 N/mm$^2$ | 33 | 34 | 37 |
| Elongation at break | DIN 53504 % | 141 | 190 | 219 |
| Tear propagation resistance | DIN 53515 N/mm$^2$ | 36 | 24 | 24 |
| Hardness | DIN 53505 Shore D | 73 | 70 | 73 |
| Modulus of elasticity in bending | DIN 53457 N/mm$^2$ | 680 | 616 | 616 |
| HDT measured in accordance with ISO 75/B | DIN 53461 °C. | 160 | 160 | 158 |
| Low-temperature brittleness | | no | no | yes |

| | | Comparative example III | Comparative example IV |
|---|---|---|---|
| NCO index | | 120 | 105 |
| Density | DIN 53420 kg/m$^3$ | 1118 | 1115 |
| Tear strength | DIN 53504 N/mm$^2$ | 34 | 40 |
| Elongation at break | DIN 53504 % | 158 | 248 |
| Tear propagation resistance | DIN 53515 N/mm$^2$ | 21 | 28 |
| Hardness | DIN 53505 Shore D | 72 | 72 |
| Modulus of elasticity in bending | DIN 53457 N/mm$^2$ | 662 | 608 |
| HDT measured in accordance with ISO 75/B | DIN 53461 °C. | 165 | 154 |
| Low-temperature brittleness | | yes | no |

Example 3 confirms the greater processing latitude of the formulations prepared using the novel N-propoxylated polyoxyalkylene-polyamines containing at least 50% of secondary amino groups. Even at an NCO index of 120, the occurrence of the brittleness which is typical of high NCO indices is not observed. Primary polyoxypropylenediamine (Comparative Example III) gives brittle moldings at this NCO index. In the case of N,N'-dibenzylpolyoxypropylenediamine, this is the case even at an NCO index of 110; only at an NCO index of 105 does no brittleness occur. The moldings obtained as described in Example 3 are distinguished by the same or better flow properties, good green strength and good mechanical properties.

Moldings containing fillers

EXAMPLE 4

Polyoxyalkylene-polyamine component (Component A) Mixture comprising
  63.5 parts by weight of N,N'-di(2-hydroxypropyl)-polyoxypropylenediamine mixture from Example 1,
  30.0 parts by weight of a mixture of 1-methyl-3,5-diethyl-2,4-phenylenediamine and 1-methyl-3,5-diethyl-2,6-phenylenediamine in the weight ratio 80: 20,
  4.1 parts by weight of N,N'-polyoxypropylenedicyclopentyl imine (III),
  1.9 parts by weight of zinc stearate and
  0.5 parts by weight of oleic acid.

Isocyanate Component (Component B): as in Example 2.

Component A was mixed with sufficient filler (ground glass fibers) so that 20% of filler were present in the molding by mixing of Components A and B at an NCO index of 110. The mold temperature was 65° C. Otherwise, the procedure was similar to that of Example 2.

COMPARATIVE EXAMPLES V AND VI

The procedure was similar to that of Example 4, but the novel N,N'-di(2-hydroxypropyl)polyoxypropylenediamine mixture was replaced by the above-mentioned polyoxypropylenediamine (I) or N,N'-dibenzylpolyoxypropylenediamine (II).

COMPARATIVE EXAMPLE V

Polyoxyalkylene-polyamine component (Component A) Mixture comprising
  63.5 parts by weight of Polyoxypropylenediamine (I) (Jeffamine ® D 2000),
  30.0 parts by weight of a mixture of 1-methyl-3,5-diethyl-2,4-phenylenediamine and 1-methyl-3,5-diethyl-2,6-phenylenediamine in the weight ratio 80:20,
  4.1 parts by weight of N,N'-polyoxypropylenedicyclopentylimine (III),
  1.9 parts by weight of zinc stearate and
  0.5 parts by weight of oleic acid.

COMPARATIVE EXAMPLE VI

Polyoxyalkylene-polyamine component (Component A) Mixture comprising
  3.5 parts by weight of N,N'-dibenzyl-polyoxypropylenediamine (II)
  30.0 parts by weight of a mixture of 1-methyl-3,5-diethyl-2,4-phenylenediamine and 1-methyl-3,5-diethyl-2,6-phenylenediamine in the weight ratio 80:20,
  4.1 parts by weight of N,N'-polyoxypropylenedicyclopentylimine (III),
  1.9 parts by weight of zinc stearate and 0.5 parts by weight of oleic acid.

Table 5 shows the A:B mixing ratios used (with filler) and the flow properties measured by the abovementioned method at 65° C. and the shore hardnesses after 40 seconds as a measure of the curing behavior.

TABLE 5

| Ex. | Comp. Ex. | A:B mixing ratio = 100: | NCO index | Shore D hardness after 40 seconds |
|---|---|---|---|---|
| 4 | | 64.9 | 110 | 59 |
| | V | 65.4 | 110 | 55 |
| | VI | 64.6 | 110 | 54 |

The following mechanical values were measured on the moldings held at 160° C. for 1 hour (Table 6).

TABLE 6

| | | Example 4 | Comparative example V | Comparative example VI |
|---|---|---|---|---|
| Density | DIN 53420 kg/m$^3$ | 1245 | 1247 | 1254 |
| Tear strength | DIN 53504 N/mm$^2$ | 24 | 28 | 27 |
| Elongation at break | DIN 53504 % | 182 | 179 | 162 |
| Tear propagation resistance | DIN 53515 N/mm$^2$ | 29 | 32 | 33 |
| Hardness | DIN 53505 Shore D | 73 | 75 | 75 |
| Modulus of elasticity in bending | DIN 53457 N/mm$^2$ | 1570 | 1535 | 1587 |
| HDT measured in accordance with ISO 75/B | DIN 53461 °C. | 162 | 162 | 165 |

Moldings are obtained which have equally good mechanical properties and high initial hardnesses (good demoldability), with a significantly simpler synthesis of the N-propoxylated polyoxyalkylenepolyamines containing at least 50% of secondary amino groups which can be used according to the invention.

We claim:

1. A process for the preparation of elastomers containing urethane and urea groups, by reacting
    a) at least one organic and/or modified organic polyisocyanate with
    b) at least one secondary polyoxyalkylene-polyamine and
    c) at least one alkyl-substituted aromatic polyamine having a molecular weight of up to 500, in the presence or absence of
    d) catalysts,
wherein the secondary polyoxyalkylene-polyamines used are N-propoxylated polyoxyalkylene-polyamines containing at least 50% of secondary amino groups.

2. A process as claimed in claim 1, wherein the N-propoxylated polyoxyalkylene-polyamines contain, in bonded form, from 0 to 30% of primary amino groups, from 50 to 100% of N-2-hydroxypropylamino groups and from 0 to 30% of N,N-di(2-hydroxypropyl)amino groups.

3. A process as claimed in claim 1, wherein the secondary polyoxyalkylene-polyamines used are N-propoxylated polyoxyalkylene-polyamines containing at least 50% of secondary amino groups and prepared by reacting polyoxyalkylene-diamines and/or triamines with at least one mol of 1,2-propylene oxide per -NH$_2$ group in the absence of water and catalysts at from 90 to 120° C. and at from 1 to 8 bar, and, if necessary, removing the excess 1,2-propylene oxide.

4. A process as claimed in claim 1, wherein the secondary polyoxyalkylene-polyamines used are N-propoxylated polyoxyalkylene-polyamines containing at least 50% of secondary amino groups and prepared by reacting polyoxyalkylene-diamines and/or triamines with 1.0 to 1.2 mol of 1,2-propylene oxide per -NH$_2$ group in the presence or absence of catalysts at from 90° to 120° C. and at from 1 to 8 bar.

5. Process as claimed in claim 1, wherein the N-propoxylated polyoxyalkylene-polyamines are prepared using polyoxyalkylene-diamines and/or triamines having a molecular weight of 1,000 to 3,000.

6. A process as claimed in claim 1, wherein the N-propoxylated polyoxyalkylene-polyamines are used in combination with polyoxyalkylene-polyamines containing 2 to 4 primary amino groups and having molecular weights of from 1,000 to 8,000.

7. A process as claimed in claim 1, wherein the elastomers are prepared by one-shot RIM in a closed mold.

8. A process for the preparation of cellular elastomers containing urethane and urea groups as claimed in claim 1, wherein the reaction is carried out in the presence of
    e) blowing agents by RIM and with compaction in a closed mold.

9. A process as claimed in claim 1, wherein
    f) auxiliaries and/or
    g) additives are additionally used.

10. A process as claimed in any one of claims 1 to 9, wherein the modified organic polyisocyanates (a) used are polyisocyanate mixtures having an NCO content of from 8 to 33.6% by weight which contain:
    ai) polyisocyanates containing carbodiimide and/or urethane groups and made from 4,4'-diphenylmethane diisocyanate or a mixture of 4,4'- and 2,4'-diphenylmethane diisocyanates and having an NCO content of from 8 to 33.6% by weight, and/or
    aii) a prepolymer containing NCO groups and having an NCO content of from 8 to 25% by weight, based on the prepolymer weight, prepared by reacting polyoxyalkylene-polyols having a functionality of from 2 to 4 and a molecular weight of 600 to 6000 with 4,4'-diphenylmethane diisocyanate or a mixture of 4,4'- and 2,4'-diphenylmethane diisocyanates.

11. A process as claimed in any one of claims 1 to 9, wherein the alkyl-substituted aromatic polyamines (c) used are aromatic diamines which contain at least one alkyl substituent bonded in the ortho-position to each amino group and are selected from the group consisting of 1,3,5-triethyl-2,4-phenylenediamine, 1-methyl-3,5-diethyl-2,4- and/or -2,6-phenylenediamine, 3,3'-dialkyl-4,4'-diaminodiphenylmethanes having 1 to 4 carbon atoms in the alkyl radical, and 3,3', 5,5'-tetraalkyl-4,4'-diamino diphenylmethanes having 1 to 4 carbon atoms in the alkyl radical, or mixtures of at least two of said alkyl-substituted aromatic diamines.

* * * * *